United States Patent
Melamed et al.

(10) Patent No.: US 7,043,609 B2
(45) Date of Patent: May 9, 2006

(54) METHOD AND APPARATUS FOR PROTECTING A STATE ASSOCIATED WITH A MEMORY STRUCTURE

(75) Inventors: Victor Melamed, Sunnyvale, CA (US); Sorin Iacobovici, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 441 days.

(21) Appl. No.: 10/357,643

(22) Filed: Feb. 3, 2003

(65) Prior Publication Data

US 2004/0153609 A1 Aug. 5, 2004

(51) Int. Cl.
*G06F 12/08* (2006.01)
(52) U.S. Cl. .............. 711/144; 711/145; 711/156; 714/6
(58) Field of Classification Search .......... 711/156, 711/141, 144, 145, 162; 714/1, 6
See application file for complete search history.

(56) References Cited

U.S. PATENT DOCUMENTS

| | | | | |
|---|---|---|---|---|
| 6,704,838 | B1 * | 3/2004 | Anderson | 711/114 |
| 6,816,917 | B1 * | 11/2004 | Dicorpo et al. | 710/5 |
| 2004/0117571 | A1 * | 6/2004 | Chang et al. | 711/162 |
| 2004/0130837 | A1 * | 7/2004 | Papallo et al. | 361/60 |

* cited by examiner

*Primary Examiner*—Pierre-Michel Bataille
(74) *Attorney, Agent, or Firm*—Martine Penilla & Gencarella, LLP (57) ABSTRACT

A method for protecting reliability of data associated with a data array is provided. The method initiates with defining state information associated with the data array. Then, crucial state information is identified from the state information. Next, a copy of the crucial state information is generated. Then, the state information and the copy of the crucial state information are protected. Next, a worst case state associated with non-crucial information is defined. In response to detecting an error associated with the non-crucial information, the method includes defaulting to the worst case state. A computer readable media and a shared memory multiprocessor chip are also provided.

21 Claims, 5 Drawing Sheets

METHOD AND APPARATUS FOR PROTECTING A STATE ASSOCIATED WITH A MEMORY STRUCTURE

BACKGROUND OF THE INVENTION

1. Field of the Invention

The present invention relates generally to data protection schemes, and more specifically to protection of the static random access memories (SRAMs) associated with the ICs.

2. Description of the Related Art

Figure 1:
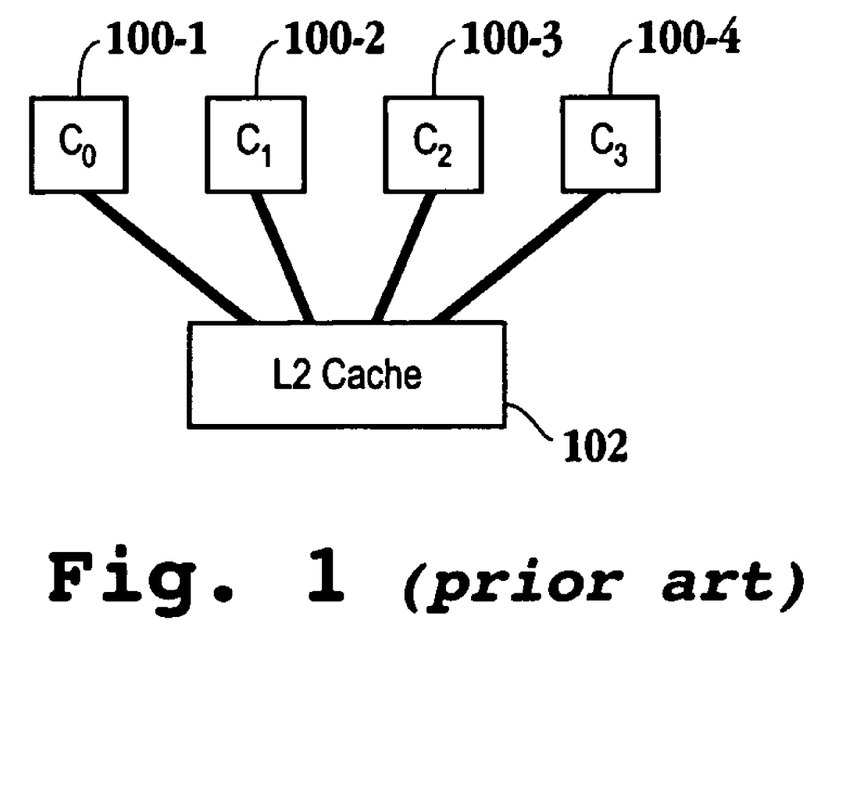
FIG. 1 is a simplified diagram illustrating the topology where multiple cores are in communication with a shared L2 cache.

In a multi-processor environment, it is important to maintain the states of the memories. More particularly, with respect to cache coherency, a state array, such as a state SRAM associated with an L2 cache of a core multi-processor (CMP), must be protected against errors. FIG. 1 is a simplified diagram illustrating the topology where multiple cores are in communication with a shared L2 cache. Here, cores $C_0$–$C_3$ 100-1 through 100-4 share L2 cache 104.

As is generally known, the cache coherency scheme keeps each processor's view of the memory consistent. A processor's access to a cache block is determined by the state of that block in the processor's cache. Cache coherence protocols for shared memory multi-processors provide an array detailing the actions for each combination of the states of the cache. The states of the cache are generally defined through a protocol, such as the Modified, Own, Exclusive, Shared, Invalid (MOESI) protocol.

The number of the multiple cores sharing the L2 cache in core multiple chips is increasing. Additionally, the size of the shared cache is also increasing. Furthermore, in a multi-thread environment, it may be necessary to track which thread within a core is modifying the line. Thus, the amount of information maintained further increases for the multi-thread environment. Therefore, it is desirable to maintain the reliability of the data in an array, such as the state array for the L2 cache, against single bit and double bit errors.

One scheme for protecting the reliability of the data in the array is the use of a parity bit. However, the parity bit does not offer any means of correcting a detected error. Another scheme for protecting large arrays is the extended Hamming code, i.e., Hamming code plus parity protection. Here, an (8,4) Hamming code is required, where for the four bits being protected, i.e., the modified, own, exclusive and share bits for the MOESI protocol, require four additional bits. One shortcoming of the Hamming code scheme is that an exclusive or (XOR) operation is required to be performed for all the state and error protection bits. That is, a full XOR of the code word is required in order to create the parity bit. Consequently, an XOR gate having eight inputs is needed. Yet another scheme to protect the reliability of the array is to create two copies of the array, i.e., mirror the array, and protect both copies with parity. Under this scheme, 12 bits would be required.

In light of the foregoing, it is desired to implement a scheme to protect the reliability of an array of data from single bit and double bit errors with a minimal amount of bits required to achieve the protection, as well as minimizing the area required for implementation of the protection scheme.

SUMMARY OF THE INVENTION

Broadly speaking, the present invention fills these needs by providing a protection scheme for state information where the number of bits associated with the state information is minimized in order to realize a savings in the area of a chip associated with the protection scheme. The present invention can be implemented in numerous ways, including as a process, an apparatus, a system, a device, or a method. Several embodiments of the present invention are described below.

In one embodiment, a method for protecting reliability of data associated with a data array is provided. The method initiates with defining state information associated with the data array. Then, crucial state information is identified from the state information. Next, a copy of the crucial state information is generated. Then, the state information and the copy of the crucial state information are protected. Next, a worst case state associated with non-crucial information is defined. In response to detecting an error associated with the non-crucial information, the method includes defaulting to the worst case state.

In another embodiment, a method for protecting state information associated with a cache line is provided. The method initiates with detecting an error with data associated with the state information associated with the cache line. Then, it is determined if the error is associated with a main copy of the state information or a mirror copy of crucial information of the state information. If the error is associated with the main copy of the state information, then the method includes A) determining state information possibilities associated with the error; B) identifying a worst case state from the state information possibilities; and C) establishing the state of the cache line as the worst case state.

In still yet another embodiment, a computer readable media having program instructions for protecting state information associated with a cache line is provided. The computer readable media includes program instructions for detecting an error with data associated with the state information associated with the cache line. Program instructions for determining state information possibilities associated with the error are provided. Program instructions for identifying a worst case state from the state information possibilities and program instructions for establishing the state of the cache line as the worst case state are included.

In another embodiment, a shared memory multiprocessor system is provided. The shared memory multiprocessor system includes a plurality of processing cores. A cache memory shared by the plurality of processing cores is also provided. The cache memory includes a state array defining state information associated with a cache line. The state information is characterized as crucial state information or non-crucial state information. The crucial state information is mirrored to provide reliability for data indicating a state of the cache line. The state of the cache line is configured to default to a worst case state upon detection of an error associated with the state information. In one embodiment, a cache coherency protocol manages accesses to the cache memory by the plurality of processing cores.

Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention is described for a system, device and method for protecting the reliability of a data array such as a random access memory (RAM), against single bit and double bit errors. It will be obvious, however, to one skilled in the art, that the present invention may be practiced without some or all of these specific details. In other instances, well known process operations have not been described in detail in order not to unnecessarily obscure the present invention. The term about as used to herein refers to +/−10% of the referenced value.

The embodiments of the present invention provide a device and method for protecting the reliability of data in an array from single bit and double bit errors for reliability purposes, while reducing the amount of bits required to afford the protection. Exemplary error sources include, alpha cosmic particles, bit flips, etc. The scheme described below exploits the nature of certain information in an array associated with a cache coherency protocol being crucial and other information not being crucial. In recognizing that the crucial information is actually less than the states identified with a cache coherency protocol, such as the five states of the Modified, Own, Exclusive, Share, Invalid (MOESI) protocol, or four states of the Modified, Own, Share, Invalid (MOSI) protocol, then a scheme using a minimal amount of bits may be developed. Of course, the performance may be impacted slightly for an error as an extra iteration may be incurred, however, the cost in performance terms is negligible as the errors are relatively infrequent. In one embodiment, the crucial state information is mirrored and both copies, the original and the mirror copy are protected with a parity bit. As a result, a minimum number of bits are required to protect the array, and furthermore, the XOR operations are minimized.

Figure 2:
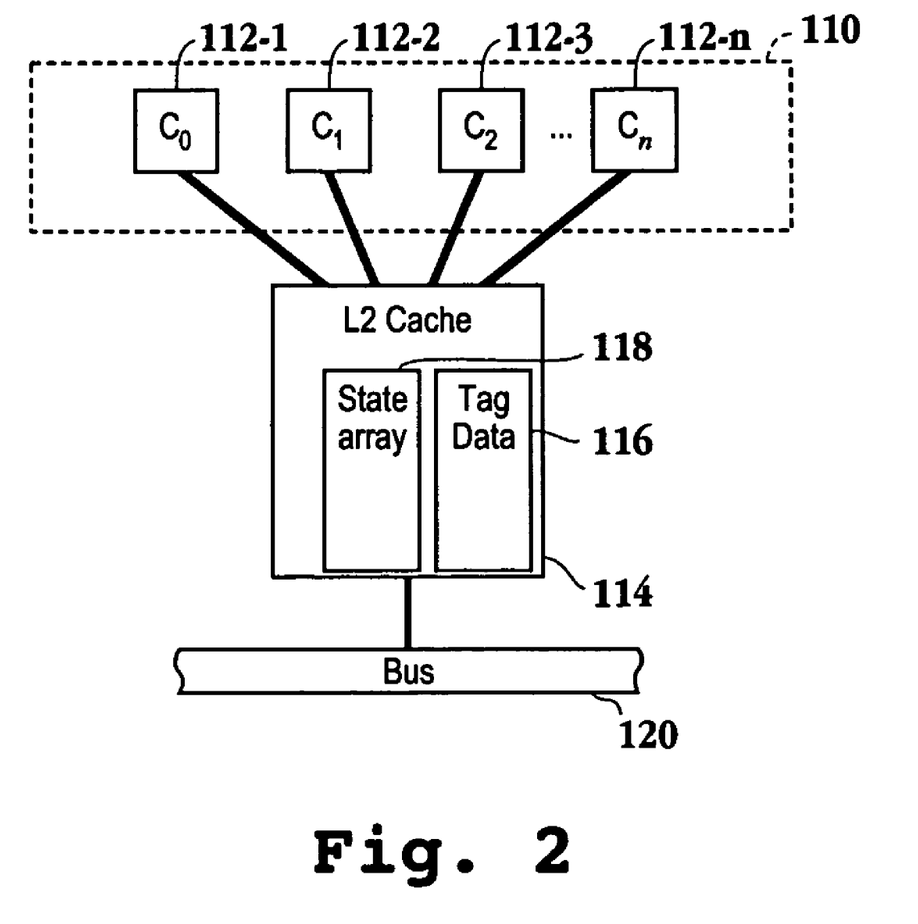
FIG. 2 is a simplified schematic diagram illustrating a chip multi-processor (CMP) sharing an L2 cache in accordance with one embodiment of the invention.

FIG. 2 is a simplified schematic diagram illustrating a chip multi-processor (CMP) sharing an L2 cache in accordance with one embodiment of the invention. CMP 110 includes multiple cores 112-1 through 112-n. Each of multiple cores 112-1 through 112-n are in communication with L2 cache 114. It should be appreciated that each of multiple cores 112-1 through 112-n are shown with a communication line proceeding directly to L2 cache 114 to represent point-to-point communication with the L2 cache. L2 cache 114 includes region 116 for tag data and region 118 for state array data. L2 cache 114 is in communication with bus 120. Bus 120 may provide communication with an external memory region, e.g., a dynamic random access memory (DRAM) or other processor chips.

One skilled in the art will appreciate that each of multiple cores 112-1 through 112-n may include a level one (L1) cache. The state array data of block 118 may be associated with data for protecting the state of the cache. Access to L2 cache 114 is managed by a cache coherency protocol, such as MOESI, MOSI, or some other similar snooping coherency protocol. It should be appreciated that with multiple cores that may or may not include multiple threads, steps must be taken to verify that the correct contents of the shared memory location are being accessed by the multiple cores. The cache coherency protocol provides a framework to ensure the correct contents of L2 cache 114 are accessed by multiple cores 112-1 through 112-n. It will be apparent to one skilled in the art that the embodiments described herein may be applied to any suitable cache coherency protocol and is not limited to the MOESI and MOSI protocols.

Figure 3:
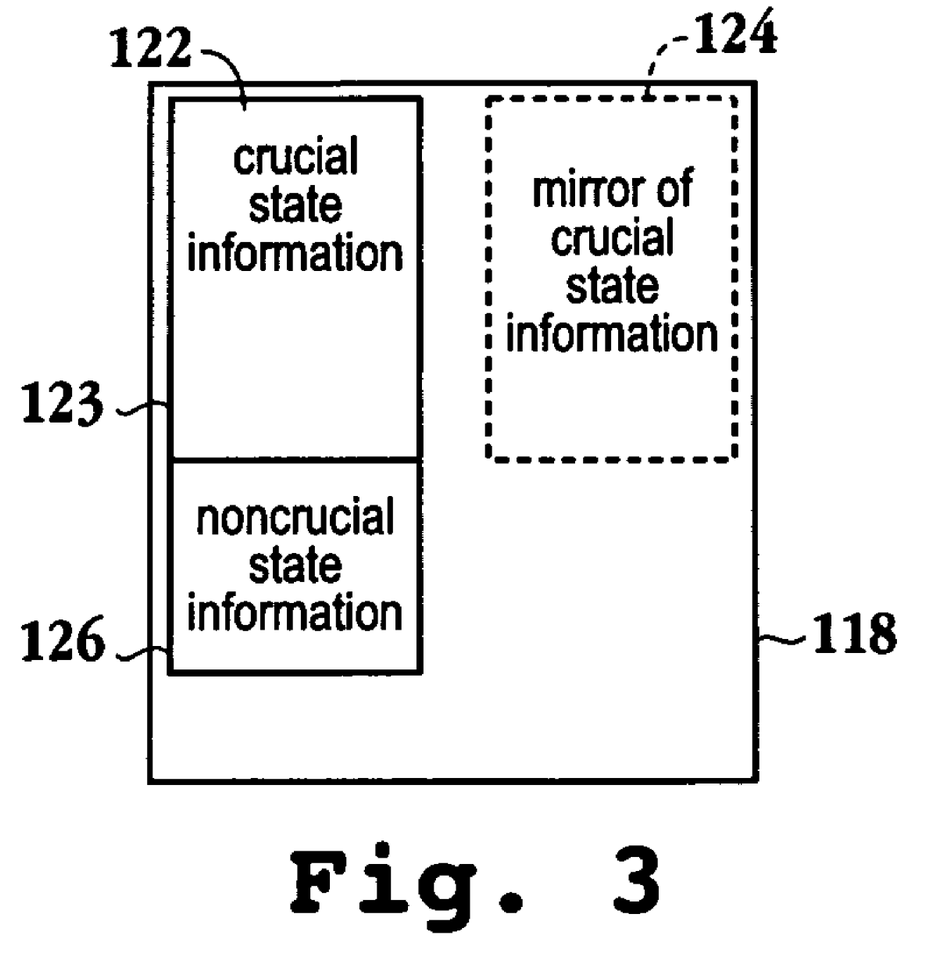
FIG. 3 is a simplified logical representation of the state array information in the L2 cache in accordance with one embodiment of the invention.

FIG. 3 is a simplified logical representation of the state array information in the L2 cache in accordance with one embodiment of the invention. As mentioned above, the state array information is contained within region 118 of the L2 cache of FIG. 2. Referring back to FIG. 3, state information block 123 includes crucial state information block 122 and non-crucial state information block 126 in accordance with one embodiment of the invention. Crucial state information block 122 is mirrored as represented by mirrored crucial state information block 124. In one embodiment, the crucial information is protected through the use of a parity bit. Non-crucial state information block 126 includes non-crucial state information as will be discussed further with reference to Tables 1–3. The characterization of the state information as crucial state information and non-crucial state information enables a reduction in the exclusive-or (XOR) operations associated with the state and error protection bits, as well as achieving area savings due to the reduction of the bits associated with the state information and the protection of the state information. In one embodiment, the area savings is equal to approximately one bit per line. Thus, as the number of cores grow, the number of lines and/or the number of threads grow, and in turn, the area savings increases. For example, for four cores, having two threads per core with 64,000 (64K) lines, a savings of one bit per line, or a total of 64K bits is achieved. Furthermore, for eight cores, the savings approaches 2 bits per line. It should be appreciated that these savings may translate to a 1–2% area savings on the chip. In another embodiment, potentially slow timing paths are eliminated due to the reduction of XOR operations for all the state and error protection bits.

TABLE 1 will be used to provide an exemplary illustration of the characterization of the crucial and non-crucial information. Here, the five states associated with the MOESI cache coherency protocol are provided in the first column. The first row of TABLE 1 includes three bit names, i.e., DIRTY, EXCLUSIVE and VALID. Thus, TABLE 1 represents the state information associated with a particular cache coherency protocol.

TABLE 1

|  | DIRTY | EXCLUSIVE | VALID |
|---|---|---|---|
| Invalid | X | X | 0 |
| Share | 0 | 0 | 1 |
| Exclusive | 0 | 1 | 1 |
| Modified | 1 | 1 | 1 |
| Owned | 1 | 0 | 1 |

The five states are defined as follows: Invalid represents a state where the cache line does not contain valid data.

Share represents a state where other caches, i.e., processors, have the cache line and the data is up to date. Exclusive represents a state where no other caches have the cache line and the data is up to date. Modified represents a state where the cache line is exclusive to the cache which has the cache line and the data in the cache is not up to date, i.e., dirty. Owned represents a state where other caches have the cache line, i.e., the cache line is not exclusive, and the data in the cache is dirty. Thus, a [001] value indicates the Share state and so on for the remaining states as illustrated in TABLE 1.

In order to protect the state of the array defined by TABLE 1 from all single bit errors and some double bit errors, the crucial information is identified in the original copy of TABLE 1 and then the crucial information is mirrored. Here, the crucial information is identified as the VALID bit and the DIRTY bit. If the VALID bit and the DIRTY bit are identified as the crucial information then the mirror copy will include those two bits without the EXCLUSIVE bit. Thus, if the EXCLUSIVE bit is lost, e.g., there is an error in the original copy, the system will not be able to differentiate between the Share and Exclusive states or the Modified and Owned states. Thus, a worst case state is assumed where the system is not able to differentiate between states. For example, between the Share and Exclusive states the Share state is considered a worst case state as other caches have the cache line. Similarly, between the Modified and Owned states, the Owned state is considered a worst case state as other caches have the cache line. Accordingly, the scheme discussed above would require three bits for the original copy (one for each bit name-DIRTY, EXCLUSIVE and VALID) and one parity bit for protection of the original copy. The mirrored copy would require two bits (one for the VALID bit and one for the DIRTY bit) and one parity bit for protection of the mirror copy. The total number of bits required here would be seven. Consequently, one less bit is required as compared to the full mirroring of the arrays.

A more specific embodiment for protecting the state of the cache line is described below. Here, the cache coherency protocol includes 5 states for the cache line: INVALID, MODIFIED, OWN, SHARED and NO_DATA. The MODIFIED State is further broken down into M, M0–M7, and L, as illustrated in TABLE 2 below. M represents a state where any core has permission to modify the line, i.e. there is no local copy of the line in any of the L1 caches of the cores. M0 represents a state that core 0 (core 0 being core 0 strand 0) has permission to modify the line. M1 represents a state where core 0 strand 1 has permission to modify the line, and so on for M2–M7. L represents a state where multiple cores may have a copy of the line, therefore, no core has permission to modify the line without notifying the other cores. NO_DATA represents a state where there was uncorrectable error in the data. Here, the processor still assumes responsibility for the line and performs the appropriate handshake with the device requesting the line, however, the data is damaged. The five bits, with the MODIFIED bit being expanded as described above are shown in TABLE 2 below:

TABLE 2

| State | b4 | b3 | b2 | b1 | VALID |
|---|---|---|---|---|---|
| INVALID | X | X | X | X | 0 |
| M0 | 0 | 0 | 0 | 0 | 1 |
| M1 | 0 | 0 | 0 | 1 | 1 |
| M2 | 0 | 0 | 1 | 0 | 1 |
| M3 | 0 | 0 | 1 | 1 | 1 |

TABLE 2-continued

| State | b4 | b3 | b2 | b1 | VALID |
|---|---|---|---|---|---|
| M4 | 0 | 1 | 0 | 0 | 1 |
| M5 | 0 | 1 | 0 | 1 | 1 |
| M6 | 0 | 1 | 1 | 0 | 1 |
| M7 | 0 | 1 | 1 | 1 | 1 |
| M | 1 | 0 | 0 | 0 | 1 |
| L | 1 | 0 | 0 | 1 | 1 |
| OWN | 1 | 0 | 1 | 0 | 1 |
| SHARED | 1 | 0 | 0 | 1 | 1 |
| NO_DATA | 1 | 1 | X | X | 1 |

A single megastate (R), which contains the (OWN, M, L, M0, M1–M7) states, may be defined to consolidate the size of the array where crucial and non-crucial information are identified. Thus, TABLE 3 represents the crucial information. Here, the consolidation of the above identified states into the R state allows for area savings but the ability to define the sub-states within the R state is lost. Accordingly, a worst case state is identified so that in case of an error, the states of the cache line may be recovered. It should be appreciated that TABLE 2 represents the original copy of the state information, while Table 3 represents the copy of the crucial state information.

TABLE 3

| STATE | ENC1 | ENC0 |
|---|---|---|
| INVALID | 0 | 0 |
| NO_DATA | 0 | 1 |
| R | 1 | 1 |
| SHARED | 1 | 0 |

The bits identified as ENC0 and ENC1 identify the four states of INVALID, NO_DATA, R, and SHARED corresponding to the crucial information. It should be appreciated that a parity bit (PARITY1) protects bits b4 to b0 of TABLE 1 and another parity bit (PARITY2) protects the ENC1 and ENC0 bits of TABLE 3. Accordingly, if there was a parity problem with PARITY1 then the state is recovered from ENC1 and ENC0. However, due to the consolidation of the crucial information from TABLE 2 to TABLE 3, the differentiation within the R megastate is lost. Therefore, a worst case state within the R megastate is identified and is set as a default state in the case of an error associated with the original copy. The worst case state of the states defined by the R megastate is the OWN state. The OWN state represents a state where other caches have the cache line, i.e., the cache line is not exclusive, and the data in the cache is dirty. Thus, if it is unclear which sub-state within the R megastate due to an error within the original copy as discussed below with reference to FIGS. 4 and 5, the default state is set to OWN, which is the most conservative assumption. Here, invalidations on the external bus are sent to all cores in the chip. Therefore, in the rare event of ECC errors it is enough to preserve the knowledge that the state is the R state, i.e. the crucial information. As an error event is rare there will be no noticeable performance implications. If there is a parity problem with ENC1 and ENC2, the ENC1 and ENC2 bits are recalculated from the original bits. Parity errors in both copies cause the L2 cache controller to request a system reset (fatal error). Accordingly, the full 9 bit encoding looks as follows:

PARITY2, ENC1, ENC0, PARITY1, b4, b3, b2, b1, VALID

As can be seen, nine bits are used here as opposed to ten or twelve bits required by full mirroring or extended Hamming codes. As a result, the reduction in the number of bits required for protecting the state information correlates to a reduction in the area required for the chip. An increase in the number of cores and threads per core will correspondingly increase the efficiency of this scheme. It should be appreciated that the above example is shown for illustrative purposes and is not meant to be limiting. That is, any suitable cache coherency protocol that may be characterized as having crucial and non-crucial information may be utilized with the embodiment described herein. More specifically, any suitable snooping cache coherency protocol, e.g., the MOESI protocol, MOSI protocol, etc., where crucial and non-crucial information are identified, the crucial information is mirrored and both the original copy and the mirror copy are parity protected. It should be appreciated that the term original copy is interchangeable with the term main copy. The mirror of the crucial information results in the reduction of at least one bit as compared to a full mirroring protection scheme or extended Hamming code scheme. Additionally, it is unnecessary to XOR all of the state and error protection bits. Consequently, potentially slow timing paths are eliminated where the slow timing paths are generally associated with larger and faster buffers that cause the chip size to grow and more complex circuit designs. The slow timing paths also set the upper limit of the chip frequency.

Figure 4:
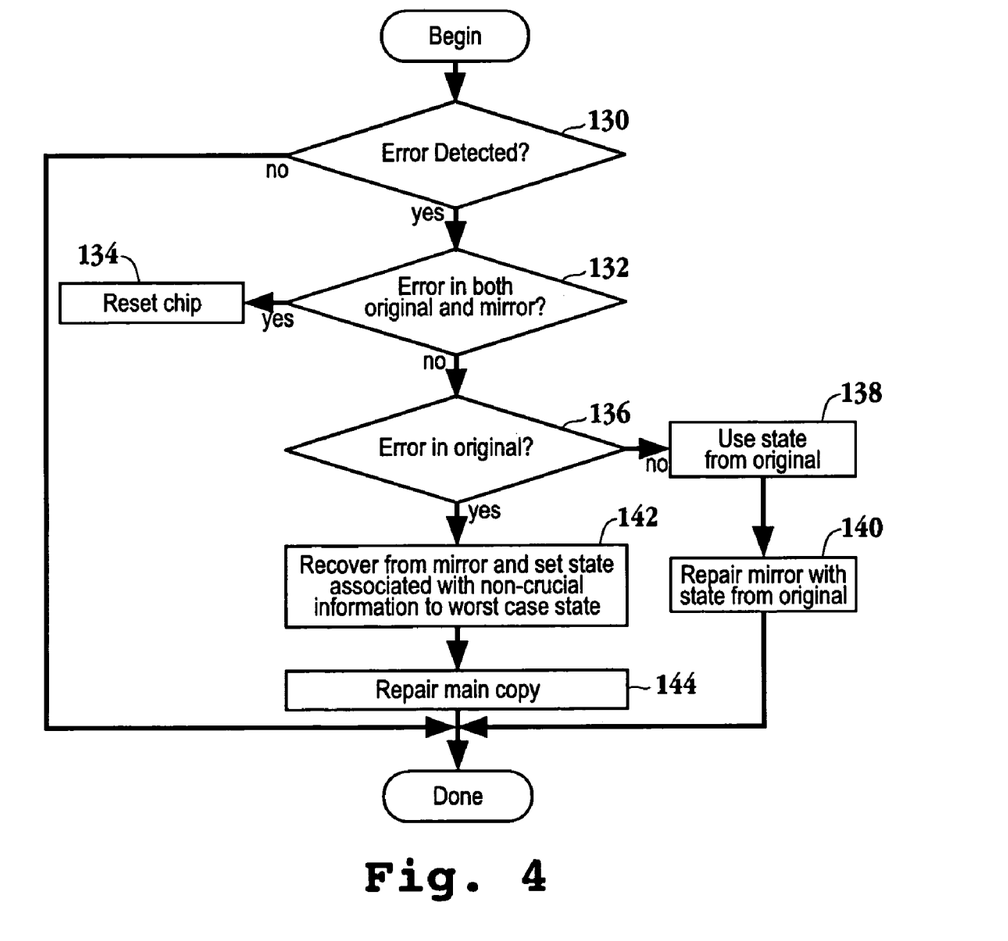
FIG. 4 is a flow chart diagram illustrating the method operations for protecting the state of a shared cache in accordance with one embodiment of the invention.

FIG. 4 is a flow chart diagram illustrating the method operations for protecting the state of a shared cache in accordance with one embodiment of the invention. The method initiates with decision operation 130 where it is determined if an error is detected. If an error is not detected in decision operation 130, the method terminates. If an error is detected in decision operation 130, then the method advances to decision operation 132. In decision operation 132 it is determined if an error is in both the original, i.e., main copy, and the mirror copy. As discussed above with reference to TABLES 1–3 and FIGS. 2 and 3, the mirror copy is a mirror of the crucial state information of the main copy. If the error is in both the original and the mirror copies, then the method proceeds to operation 134 where the chip is re-set. It should be appreciated that in operation 134 the error is fatal, thereby causing the chip to re-set. If the error is not in both the original and the mirror copies, then the method moves to decision operation 136 where it is determined if the error is in the original copy.

If the error is not in the original copy in decision operation 136 of FIG. 4, then the method advances to operation 138 where the state information of the cache line as determined by the original copy is used. From operation 138, the method advances to operation 140 where the mirror copy is repaired with the state from the original copy. Here, the crucial information of the original state information is copied to define the mirror copy. If the error is in the original block in decision operation 136, then the method proceeds to operation 142 where the state information is recovered from the mirror copy. Since the state associated with the non-crucial information may not be able to be determined, then the state of the cache line defaults to a worst case recoverable state. It should be appreciated that the mirror copy is of the crucial information, therefore the non-crucial information is not recoverable. However, by assuming a worst case state, the reliability is preserved. The method then advances to operation 144 where the main copy i.e., the original is repaired. Here, any ambiguity associated with the unknown non-crucial information defaults to the worst case state.

Figure 5:
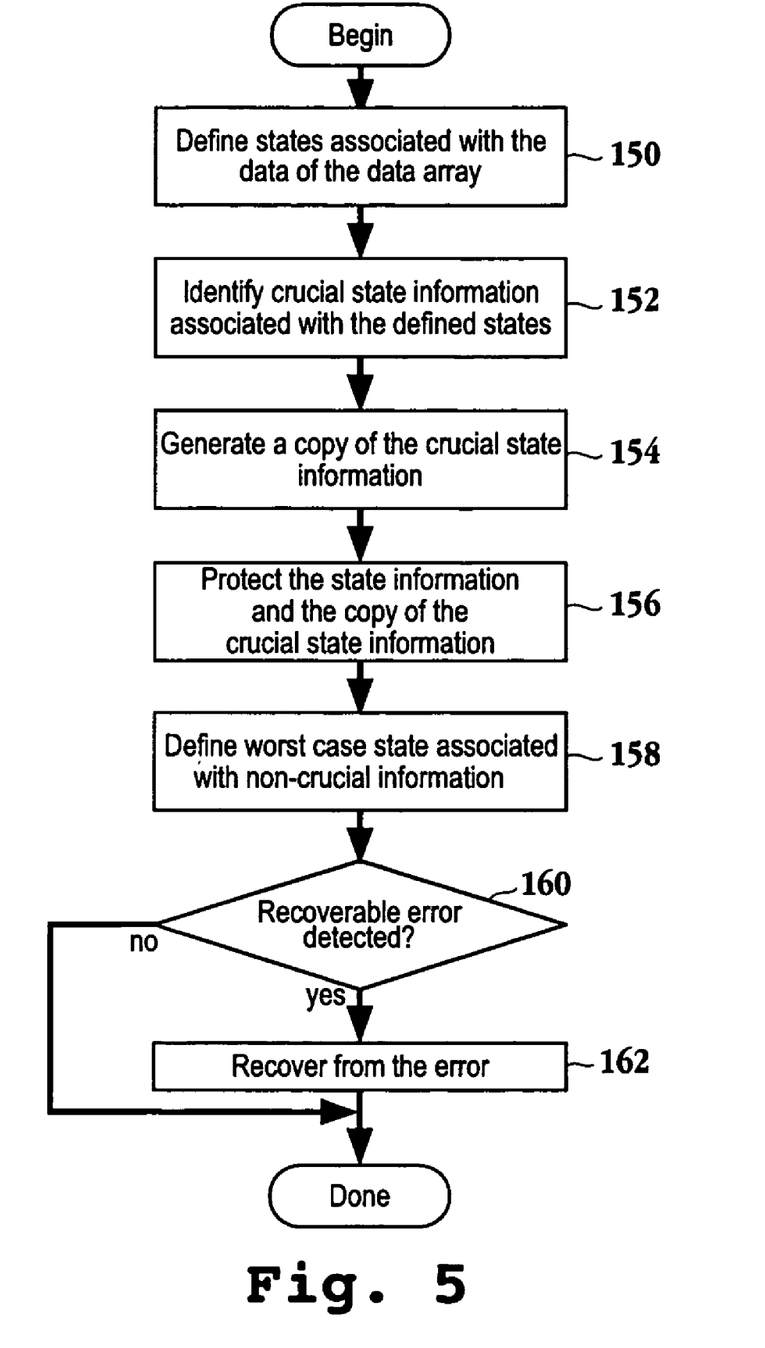
FIG. 5 is a flow chart diagram illustrating the method operations for protecting reliability of data associated with a data array in accordance with one embodiment of the invention.

FIG. 5 is a flow chart diagram illustrating the method operations for protecting reliability of data associated with a data array in accordance with one embodiment of the invention. The method initiates with operation 150 where the states associated with the data of the data array are defined. Here, the states could follow any suitable snooping cache coherency protocol, e.g., the MOESI protocol, the MOSI protocol, etc. In one embodiment, the states are defined as illustrated in either TABLE 1 or TABLES 2 and 3. The method then advances to operation 152 where crucial state information associated with the defined states is identified. It should be appreciated that as used with respect to a cache, the state information refers to the state of a cache line. For example, the crucial state information may be characterized as discussed with reference to Tables 1–3 above. The method then proceeds to operation 154 where a copy of the crucial state information is generated. Here, the crucial state information is mirrored in the state array region of the L2 cache as illustrated above with reference to FIG. 2.

The method of FIG. 5, then moves to operation 156 where the state information and the copy of the crucial state information are protected. In one embodiment, a parity bit is used to protect the main copy of the state information and the mirror copy of the crucial state information. The method then advances to operation 158 where a worst case state associated with non-crucial information is defined. Here, the worst case state associated with a non-crucial information may be configured as discussed above with reference to Tables 1–3. For example, the worst case configuration may be a most conservative assumption, such as a state where the control of the cache line is not exclusive. The method the proceeds to decision operation 160 where it is determined if an error has been detected and if the error is a recoverable error. If a recoverable error has not been detected, the method terminates. In one embodiment, the chip resets if there is an error that is not recoverable. If a recoverable error has been detected, then the method advances to operation 162. In operation 162, recovery from the error occurs. For example, the state information may recover fully, and repair, or recover to a worst case state depending on the type of error. For example, if the error is in both the main copy and the mirror copy then the error is fatal and the chip will have to reset as the error is not a recoverable error. If the error is associated with either the main copy or the mirror copy, then the state of the cache line may default to a worst case state (error associated with the main copy) or recover fully and repair (error associated with the mirror copy) as discussed with reference to FIG. 4.

In summary, the present invention provides a scheme for protecting the state array of a cache against single bit errors and some double bit errors. The scheme defines crucial information of the state array and mirrors that crucial information. As a tradeoff for the reduction of information mirrored, the system may lose the ability to differentiate between certain states in the case of an error associated with the main copy of the state information. In order to preserve the reliability of the state information in the case of an error, a worst case state is assumed for the cache line. By mirroring the crucial state information rather than all the state information, the bits associated with the main copy and the mirror copy may be reduced, which corresponds to a reduction in the size of the chip. In addition, the amount of XOR operations is minimized, thereby eliminating potentially slow timing paths. As discussed above, the embodiments described herein may be applied to any suitable cache coherency protocol. Furthermore, the concepts may also be expanded for the protection of any suitable array of data.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for protecting reliability of data associated with a data array, comprising:
    defining state information associated with the data array;
    identifying crucial state information from the state information;
    generating a copy of the crucial state information, the copy of the crucial state information is a subset of the state information, thereby enabling a reduction in a number of bits associated with the state information;
    protecting the state information and the copy of the crucial state information;
    defining a worst case state associated with non-crucial information; and
    in response to detecting an error associated with the non-crucial information, the method includes,
    defaulting to the worst case state.

2. The method of claim 1, wherein the method operation of protecting the state information and the copy of the crucial state information includes,
    associating each of the state information and the crucial state information with a parity bit.

3. The method of claim 1, wherein the worst case state is configured to assume control of a cache line is not exclusive.

4. The method of claim 1, wherein the state information is associated with the state of a cache.

5. The method of claim 1, wherein the state information is associated with one of a Modified, Own, Exclusive, Share, and Invalid (MOESI) and a Modified, Own, Share, and Invalid (MOSI) cache coherency protocol.

6. A method for protecting state information associated with a cache line, comprising:
    detecting an error with data associated with the state information associated with the cache line;
    determining if the error is associated with one of a main copy of the state information and a mirror copy of crucial information of the state information, the mirror copy of crucial information being a subset of the state information, thereby enabling a reduction in a number of bits associated with the state information;
    if the error is associated with the main copy of the state information, then the method includes;
        determining state information possibilities associated with the error;
        identifying a worst case state from the state information possibilities; and
        establishing the state of the cache line as the worst case state.

7. The method of claim 6, wherein if the error is associated with the mirror copy of crucial information of the state information, then the method includes;
    applying the state information associated with the main copy; and
    repairing the mirror copy of crucial information of the state information with the state information from the main copy.

8. The method of claim 6, wherein the state information determines a state of the cache line shared by multiple microprocessors.

9. The method of claim 8, wherein the worst case state is configured to assume control of a cache line by one of the multiple microprocessors is not exclusive.

10. The method of claim 6, wherein the state information possibilities are selected from a group of states consisting of modified, own, exclusive and share.

11. A shared memory multiprocessor chip, comprising: a plurality of processing cores; and
    a cache memory shared by the plurality of processing cores, the cache memory including a state array defining state information associated with a cache line, the state information being characterized as one of crucial state information and non-crucial state information, the crucial state information being mirrored to provide reliability for data indicating a state of the cache line, the mirror of the crucial state information is a subset of the state information, thereby enabling a reduction in a number of bits associated with the state information, wherein the state of the cache line is configured to default to a worst case state upon detection of an error associated with the state information.

12. The chip of claim 11, wherein each of the plurality of processing cores are multi-threaded.

13. The chip of claim 11, wherein the cache memory is a Level 2 cache memory.

14. The chip of claim 11, wherein the state information includes states selected from a group consisting of modified, own, exclusive and share.

15. The chip of claim 11, further comprising:
a cache coherency protocol managing access to the cache memory by the plurality of processing cores.

16. The chip of claim 15, wherein the cache coherency protocol is a snooping cache coherence protocol.

17. A computer readable medium having program instructions for protecting reliability of data associated with a data array, comprising:
program instructions for defining state information associated with the data array;
program instructions for identifying crucial state information from the state information;
program instructions for generating a copy of the crucial state information, the copy of the crucial state information is a subset of the state information, thereby enabling a reduction in a number of bits associated with the state information;
program instructions for protecting the state information and the copy of the crucial state information;
program instructions for defining a worst case state associated with non-crucial information; and
in response to detecting an error associated with the non-crucial information, the computer readable medium includes,
program instructions for defaulting to the worst case state.

18. The computer readable medium of claim 17, wherein the program instructions for protecting the state information and the copy of the crucial state information includes,
program instructions for associating each of the state information and the crucial state information with a parity bit.

19. The computer readable medium of claim 17, wherein the worst case state is configured to assume control of a cache line is not exclusive.

20. The computer readable medium of claim 17, wherein the state information is associated with the state of a cache.

21. The method of claim 17, wherein the state information is associated with one of a Modified, Own, Exclusive, Share, and Invalid (MOESI) and a Modified, Own, Share, and Invalid (MOSI) cache coherency protocol.

* * * * *